US007716681B2

(12) United States Patent
Hackmann

(10) Patent No.: US 7,716,681 B2
(45) Date of Patent: May 11, 2010

(54) SERVICE PROVIDER INHERITANCE IN A DIGITAL INFORMATION SYSTEM

(75) Inventor: Herbert Hackmann, Wiesloch (DE)

(73) Assignee: SAP AG, Walldorf (DE)

( * ) Notice: Subject to any disclaimer, the term of this patent is extended or adjusted under 35 U.S.C. 154(b) by 1226 days.

(21) Appl. No.: 11/264,562

(22) Filed: Nov. 1, 2005

(65) Prior Publication Data

US 2007/0100971 A1 May 3, 2007

(51) Int. Cl.
*G06F 9/44* (2006.01)
(52) U.S. Cl. .................... 719/316; 717/121; 719/331
(58) Field of Classification Search .................. 707/10; 709/220, 221, 222; 713/100; 717/120, 121; 719/316, 331, 332
See application file for complete search history.

(56) References Cited

U.S. PATENT DOCUMENTS

| | | | | |
|---|---|---|---|---|
| 5,437,025 | A | * | 7/1995 | Bale et al. ............... 707/103 R |
| 5,943,497 | A | * | 8/1999 | Bohrer et al. ............... 717/121 |
| 6,006,235 | A | | 12/1999 | Macdonald et al. |
| 6,049,665 | A | | 4/2000 | Branson et al. |
| 6,134,552 | A | | 10/2000 | Fritz et al. |
| 6,167,564 | A | | 12/2000 | Fontana et al. |
| 6,430,563 | B1 | | 8/2002 | Fritz et al. |
| 6,654,793 | B1 | | 11/2003 | Wollrath et al. |
| 6,788,317 | B2 | | 9/2004 | Gardas et al. |
| 6,859,931 | B1 | | 2/2005 | Cheyer et al. |
| 6,895,581 | B1 | * | 5/2005 | Chkodrov et al. ........... 717/159 |
| 6,957,228 | B1 | * | 10/2005 | Graser ................... 707/103 R |
| 2002/0186250 | A1 | | 12/2002 | Gardas et al. |
| 2003/0208583 | A1 | * | 11/2003 | Schroeder ................. 709/223 |
| 2004/0243974 | A1 | | 12/2004 | Gardas et al. |

OTHER PUBLICATIONS

D'Andrea V. et al, "Interface inheritance for object-oriented service composition based on model driven configuration", 9 pgs., ICSOC'04 forum, TJ Watson:IBM, 2004. Atti del convegno "ICSOC forum", New York, 2004.

I. Fikouras et al., "Service Orchestration with Generic Service Elements", 5 pgs., The 6th International Symposium on Wireless Personal Multimedia Communications (WPMC 2003), Yokosuka, Kanagawa, Japan, Oct. 19-22, 2003, Yokosuko Research Park (YRP), IEEE Tokyo Section, Proceedings of WPMC 2003, (2003).

(Continued)

*Primary Examiner*—Hyung S Sough
*Assistant Examiner*—Charles E Anya
(74) *Attorney, Agent, or Firm*—Buckley, Maschoff & Talkwalkar LLC

(57) ABSTRACT

A computer-implemented method of configuring a computing system may include receiving first user-actuated input selecting an existing service provider that processes data objects having a first data object type. The existing service provider may include at least a first class and a second class. Second user-actuated input may be received that identifies the first class and provides a replacement class to use in creating a new service provider to process data objects having a second data object type. An association may be stored in a service provider system between the second data object type, the existing service provider, the first class and the replacement class. During runtime, the service provider system may create the new service provider to process data objects having the second data object type by inheriting the second class from the existing service provider and incorporating the replacement class in place of the first class.

25 Claims, 7 Drawing Sheets

OTHER PUBLICATIONS

Singh & Huhns, "Chapter 5—Principles of Service-Oriented Computing", pp. 73-86, Jul. 7, 2004.

"Overview of CORBA", <URL:http://www.cs.wustl.edu/~schmidt/corba-overview.html>[retrieved on Apr. 19, 2005], 4 pgs.

* cited by examiner

SERVICE PROVIDER INHERITANCE IN A DIGITAL INFORMATION SYSTEM

TECHNICAL FIELD

This disclosure relates to service provider inheritance in a digital information system.

BACKGROUND

Various entities may use digital information systems to manage information of all kinds. For example, a manufacturing company may use an enterprise resource planning (ERP) system to manage its inventory, manufacturing schedules, and product orders. The manufacturing company may use the same system to manage contact information, such as employee, customer and vendor information; accounting information, such as payroll, customer invoices and vendor payments; and sales information, such as completed sales, sales forecasts, region sales summaries, and so on. As another example, a group of physicians may use a digital information system to manage patient medical information. The patient medical information may include patient demographic information; scanned notes from physicians taken during consultations with or examinations of the patient; lab results from any tests or analyses, such as tests of blood or tissue; images that may have been captured, such as x-rays, MRIs (magnetic resonance images), CAT scans (computer-aided tomography), and so. The group of physicians may also use the digital information system to track accounting information, such as payroll, patient invoices and payments, insurance invoices and payments, lab charges, and so on.

Digital information systems may be implemented on a single computer, or on a networked system of computers distributed throughout one building, several buildings, or buildings all over the world. The digital information system may include many different software components. The software components may be provided by a single company or by many different companies. Further, a digital information system may be implemented in various phases. For example, the software components may be designed and coded in a "design" phase. The software components may be integrated during a "configuration" phase of implementation. During the configuration phase, various components may be selected and configured to work together and within a specific system of computer hardware or within a specific network. Also during this configuration, various parameters of the software components may be set in order to implement a digital information system that implements the desired functions. For example, referring to the group of physicians described above, various generic, off-the-shelf ERP software components may be selected and configured, during a configuration phase, to work together and within the group's computer network to implement a system for managing patient medical information. During a "runtime" phase, programming code in the software components may be executed by one or more computer devices or systems to perform functions on the information within the system.

SUMMARY

This disclosure generally relates to service provider inheritance in a digital information system. In particular, a digital information system may include a database system that includes various data objects having different data object types, and various service providers, each of which processes a data object having a specific data object type. A service provider may include a set of classes, each of which may be a discrete unit of programming code that performs a function on the corresponding data object. Classes may have various parameters that affect the function they perform. The service providers may be registered at a configuration time of the digital information system in a service provider system. At runtime, the digital information system may provide the service provider system with a data object having a specific data object type and a desired function to perform on the data object. The service provider system may dynamically select an appropriate service provider, and use the selected service provider to perform the desired function on the data object. The service provider system may facilitate the creation of a modified service provider by replacing a class or a parameter in a "parent" service provider. At configuration time, a replacement class or a replacement parameter may be specified for use in creating the modified service provider at runtime. In this manner, the modified service provider may "inherit" many characteristics of the parent service provider.

In one general aspect, a computer-implemented method of configuring a computing system may include receiving first user-actuated input selecting an existing service provider that processes data objects having a first data object type. The existing service provider may include at least a first class and a second class. Second user-actuated input may be received that identifies the first class and provides a replacement class to use in creating a new service provider to process data objects having a second data object type. An association may be stored in a service provider system between the second data object type, the existing service provider, the first class and the replacement class. During runtime, the service provider system may create the new service provider to process data objects having the second data object type by inheriting the second class from the existing service provider and incorporating the replacement class in place of the first class.

In some embodiments, the computer-implemented method may further include registering the existing service provider in the service provider system. Registering the existing service provider may include storing in the service provider system a description of the first class and a description of the second class.

In some embodiments, the computer-implemented method may further include displaying a list in a graphical user interface, where the list includes the existing registered service provider and other registered service providers in the service provider system. The first user-actuated input may be received in response to displaying the list. The first user-actuated input may be received during a configuration time that precedes runtime.

In some embodiments, the first class may include class programming code that, when executed, performs a first processing operation on data objects having the first data object type; the second class may include additional class programming code that, when executed, performs a second processing operation on data objects having the first data object type. The first class may further include a class attribute that controls a first aspect of the first processing operation.

In some embodiments, the replacement class may include the class programming code and a replacement class attribute that controls the first aspect or another aspect of the first processing operation. The replacement class attribute may be different than the class attribute. In some embodiments, the replacement class may include replacement programming code that, when executed, performs an additional processing operation on data objects having the second data object type; the replacement programming code may be different than the class programming code.

In some embodiments, inheriting the second class may include incorporating the second class in the new service provider without changing the additional class programming code. Storing the association may include storing an identifier for the second data object type, an identifier for the existing service provider, an identifier for the first class and an identifier for the replacement class in a row of a relational database table.

In another general aspect, a computer-implemented method of creating a new service provider may include receiving, during runtime of a computing system, input identifying a data object having a first data object type. An association may be retrieved from a service provider system. The association may be between the first data object type, a first class, a replacement class, and an existing service provider. The existing service provider may process data objects having a second data object type, and the existing service provider may include at least the first class and a second class. A new service provider may be created to process the identified data object by inheriting from the existing service provider the second class and incorporating the replacement class in place of the first class.

In some embodiments, the first class may include class programming code that, when executed, performs a first processing operation on data objects having the second data object type; the second class may include additional class programming code that, when executed, performs a second processing operation on data objects having the second data object type. The first class may further include a class attribute that controls a first aspect of the first processing operation. The input may be received from one of multiple applications in the computing system that process data objects by employing service providers.

In some embodiments, the replacement class may include the class programming code and a replacement class attribute that controls the first aspect or another aspect of the first processing operation. The replacement class attribute may be different than the class attribute. Inheriting the second class may include incorporating the second class in the new service provider without changing the additional class programming code. The identified data object may be processed with the new service provider.

Advantages of the systems and techniques described herein may include any or all of the following. Code replication may be reduced. Modified service providers may be created through configuration input, without re-design or re-coding of an underlying service provider. Modified service providers may automatically benefit from updates and changes to a "parent" service provider through "inheritance."

The general and specific aspects may be implemented using a system, a method, or a computer program, or any combination of systems, methods, and computer programs. The details of one or more embodiments are set forth in the accompanying drawings and the description below. Other features, objects, and advantages will be apparent from the description and drawings, and from the claims.

DESCRIPTION OF DRAWINGS

These an other aspects will now be described in detail with reference to the following drawings.

Like reference symbols in the various drawings indicate like elements.

DETAILED DESCRIPTION OF EXEMPLARY EMBODIMENTS

This disclosure relates to service provider inheritance in a digital information system. The digital information system may employ various applications to process data objects having many different data object types. To process the data objects, the various applications may use service providers. A service provider may include a module of programming code that performs a particular function or provides a particular interface. For example, in some embodiments, the service provider may be implemented in an object-oriented computer programming language, and the service provider may include one or more object-oriented classes that may be used to process a particular kind of data object. Classes may have various parameters that affect the function they perform. The service providers may be registered at a configuration time in a service provider system. At runtime, the digital information system may provide the service provider system with a data object having a specific data object type and a desired function to perform on the data object. The service provider system may dynamically select an appropriate service provider, and may use the selected service provider to perform the desired function on the data object. The service provider system may facilitate the creation of a modified service provider by replacing a class or a parameter in a "parent" service provider. In particular, a replacement class or a replacement parameter may be specified at a configuration time for use in creating the modified service provider at runtime. At runtime, the service provider system may dynamically create the modified service provider from the parent service provider by "inheriting" the classes and parameters from the parent service provider and incorporating a replacement class or replacement parameter that was specified at configuration time.

Figure 1A:
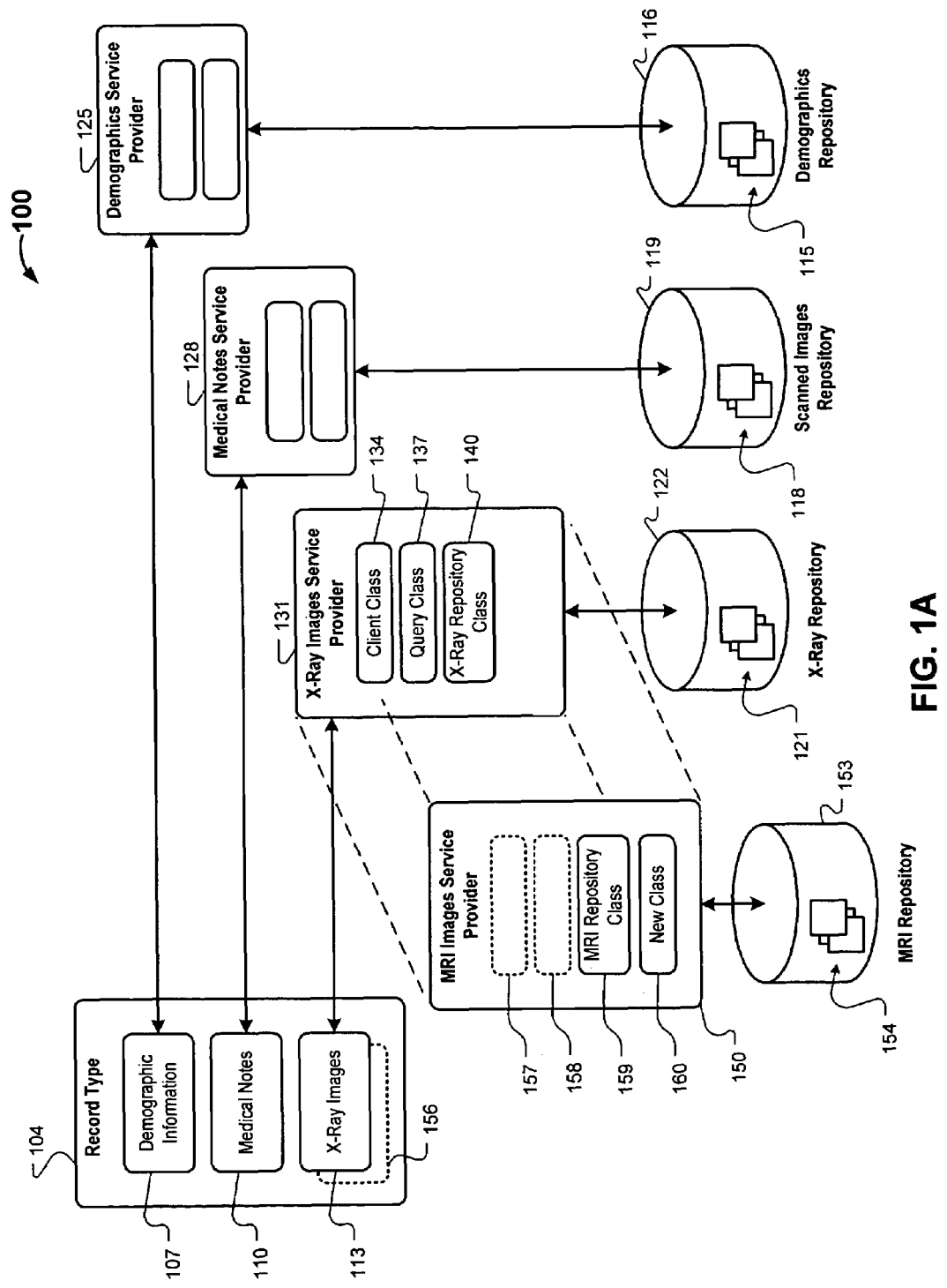
FIG. 1A is a conceptual block diagram of various components of an exemplary digital information system in which a modified service provider may be created at runtime by inheriting various characteristics from a parent service provider, according to some embodiments.

FIG. 1A is a conceptual block diagram of various components of an exemplary digital information system 100 in which a modified service provider may be created at runtime by inheriting various characteristics from a parent service provider, according to some embodiments. An exemplary digital information system 100 may be used to process medical information for various patients. The patient medical information may be displayed in various information records having a record type 104. Records having the record type 104 may include various elements, including, for example, an element 107 for demographic information (e.g., a patient's name, date of birth, address, medical history, etc.), an element 110 for medical notes (e.g., scanned images of handwritten notes from physician-patient interactions, lab reports, test results, etc.), and an element 113 for medical images, such as x-rays.

The digital information system 100 may include various applications (shown in FIG. 1C) to process the patient medical records. For example, one application may display a comprehensive view of a patient's medical information, including demographic information for the patient; medical notes compiled by various physicians who have seen or treated the patient; and medical images, such as x-ray images, that may have been taken of the patient. In some embodiments, these various kinds of medical information may correspond to the elements of a record having a record type 104.

Data objects representing information for each record element may be stored in various repositories in the digital information system 100. For example, demographic information may be stored in demographic data objects 115 in a demographics repository 116; certain medical notes may be stored as scanned images 118 in a scanned-images repository 119; and x-ray images 121 may be stored in an x-ray images repository 122.

Applications (see FIG. 1C) in the digital information system 100 may employ various service providers to process patients' medical information. Each service provider may process a data object having a specific data object type. For example, the digital information system 100 may include a demographics service provider 125 to process demographic data objects 115, a medical notes service provider 128 to process scanned images 118, and an x-ray image service provider 131 to process x-ray images 121. Each service provider 125, 128 and 131 may provide a logical interface between the elements 107, 110 and 113, respectively, in the record element type 104, and the corresponding data objects in the respective repositories 116, 119 and 122.

In some embodiments, each service provider may include a module of programming code that performs a particular function or provides a particular interface. For example, in some embodiments, the service providers may be implemented in an object-oriented computer programming language, and the service provider may include one or more object-oriented classes that may be used to process a particular kind of data object. Each object-oriented class may implement one or more interfaces. An interface may include various attributes and methods necessary for two different systems or portions of programming code to communicate with each other.

Figure 1B:
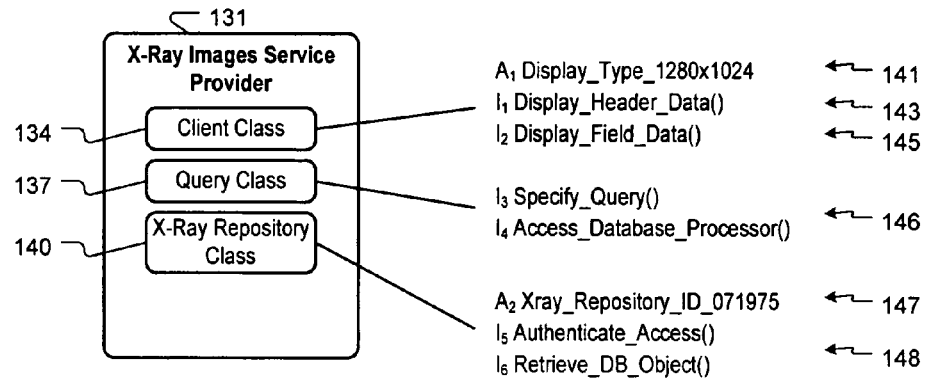
FIG. 1B is a diagram of an exemplary service provider, according to some embodiments.

Referring to FIG. 1B, the exemplary x-ray image service provider 131 may include three classes: a client class 134, a query class 137 and an x-ray repository class 140. As shown, each class may have various attributes and implement various interfaces. For example, the client class 134 may include an attribute 141 that configures how information processed by the x-ray image service provider 131 is to be displayed on a client device; more particularly, the attribute 141 may specify a resolution at which to display data, such as x-ray image data. The client class 134 may further implement various methods, such as the methods 143 and 145. The methods 143 and 145 may be, for example, subroutines that various applications within the digital information system 100 may access to display data in a particular format. More particularly, various applications may use the method 143 to display data in a header portion of a graphical user interface (GUI); the applications may use the method 145 to display data in various fields within a GUI. The query class 137 may implement other methods, such as the methods 146, and the x-ray repository class 140 may implement other methods, such as the methods 148. Further, the x-ray repository class may include various attributes, such as the attribute 147. As shown, the attribute 147 may identify a repository with which the x-ray repository class interacts.

Figure 1C:
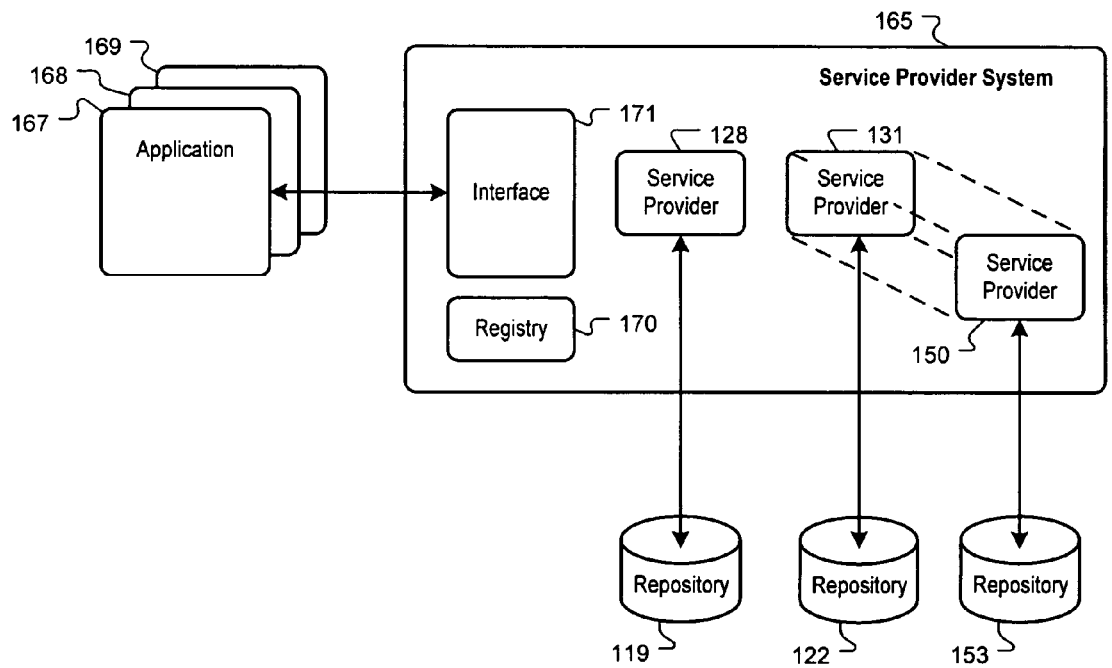
FIG. 1C is a diagram of an exemplary service provider system, according to some embodiments.

Applications in the digital information system may interact with various service providers through a service provider system, such as the service provider system 165 that is shown in FIG. 1C. As shown in FIG. 1C, applications, such as the applications 167, 168, and 169 may user the service providers (e.g., service providers 128, 131 and 150) in the service provider system 165 to perform various functions. The service provider system 165 may include a registry 170 in which the service providers 128, 131 and 150 are indexed or registered, and the service provider system may further include an interface 171 through which the service provider system 165 may interact with the applications 167, 168 and 169.

The interface 171 may facilitate efficient design, coding, configuration, and runtime processing of data object in the digital information system by providing a layer of abstraction in the system. More particularly, the interface 171 may receive input from an application that identifies a particular task to perform, such as, for example, to "retrieve for display the x-ray image having identifier 718974." In some embodiments, the task may inherently identify, at a programming code level, one or more object-oriented classes that are able to execute the task. Based on the object-oriented classes that are able to execute the task, the interface 171 may identify one or more service providers (e.g., service provider 131) that implements the identified object-oriented classes, and the interface 171 may further pass to the identified service provider 131 any parameters necessary to execute the task (e.g., "x-ray image 718974"). After the identified service provider 128 executes the task, the interface 171 may return any data or output to the application 167. For example, in the scenario described above involving retrieving an x-ray image, the service provider 131 may perform "back-end" tasks, such as, for example, navigating any networks between a computer device executing the application 167, and the x-ray images repository 122, where the x-ray image "718974" may be stored; authenticating the access of the medical images repository 122; and actually retrieving and copying data associated with the relevant x-ray image. The interface 213 may provide this retrieved data to the application 167.

In this manner, application developers may be able to develop applications 167, 168 or 169 to interact with the service provider system 165 and with that system's interface 171, rather than with individual service providers. Similarly, service provider developers may develop service providers 128, 131 and 150 to interact with relevant back-end components (e.g., the repositories 119, 122 and 153) and with the interface 171, rather than with individual applications 167, 168 and 169. That is, the service provider system 165 may provide a standard interface that facilitates efficient development of service providers and applications.

In some embodiments, each service provider may be designed in a "design stage," and coded in a "coding stage" by a different software provider. One software provider, for example, may design and code a service provider to provide an interface to a particular database or repository. Another software provider may design and code another service provider to provide certain input/output functionality in a digital information system. In a "configuration stage," the various service providers may be integrated into a single system. Integration within the system may involve registering the service providers with the service provider system 165. For example, in some embodiments, service providers may be registered in the registry 170. More particularly, in some embodiments, a list or description of the object-oriented classes each service provider implements may be registered in the registry 170. The interface 171 may then use the registry 170 to identify one or more service providers that implement a desired set of object-oriented classes.

As described above, in some embodiments, the service provider system 165 may cause an appropriate service provider to be called or executed at runtime in order to provide desired functionality. In these embodiments, service providers may be added or replaced through registration or removal from the service provider framework. Thus, the service provider framework may provide a runtime interface between service providers and other parts of the system.

In some embodiments, a modified service provider may be dynamically created from a "parent" service provider that processes data objects having a first data object type. The modified service provider may process data objects having a second data object type. A modified service provider may be created by the service provider system 65 at runtime, by "inheriting" various characteristics from the parent service provider. Other "non-inherited" characteristics for the modified service provider may be supplied at runtime by the service provider system 165. For example, as shown in FIG. 1C, the service provider 150 may be dynamically created, by the service provider system 165, from the service provider 131, to process data objects in a data object repository 153. In some embodiments, the data objects in the data object repository 153 may be similar to the data objects in the data object repository 122. In some embodiments, the processing operation(s) performed by the service provider 150 may be similar to the processing operation(s) performed by the service provider 131.

The registry 170 may store information about which service providers are to be created dynamically, and from which service providers they are to inherit characteristics. For example, the registry 170 may store information that causes the service provider system 165 to dynamically create the service provider 150 from the service provider 131 in order to process data objects that are stored in the repository 153. Further, the registry 170 may store configuration information that identifies which characteristics of the service provider 131 are to be inherited by the dynamically created service provider 153 and which characteristics in the service provider 150 are to be different from the service provider 131.

Referring back to FIG. 1A, the dynamically created service provider 150 may process data objects that represent MRI images 154 and that are stored in the MRI image repository 153. In some embodiments, the MRI images 154 may be similar to the x-ray images 121, and thus, the service provider 150 may be similar to the service provider 131.

By dynamically creating the service provider 150 from the service provider 131 rather than, for example, copying underlying service provider 131 programming code and subsequently modifying it, the digital information system may reduce programming code replication. Further, dynamic creation of service providers may facilitate more robust service provider updates. By way of example, in some embodiments, a software vendor may provide the service provider 131, and a configuration programmer may create the service provider 150. If the configuration programmer creates the service provider 150 by copying the underlying programming code for the service provider 131 and subsequently modifying it, then in order to update the service provider 150 when the software vendor releases new code for the service provider 131, the configuration programmer may have to recopy and re-modify the underlying programming code of the service provider 131. On the other hand, if the configuration programmer creates the service provider 150 by configuring the service provider system 165 to dynamically create the service provider 150 at runtime by inheriting various properties from the service provider 131, the service provider 150 may automatically receive any updates to the service provider 131. This feature of inheritance in digital information system service providers may allow configuration programmers to create their own service providers, leading, in some embodiments, to more flexible digital information systems.

The means by which a service provider system may dynamically create a service provider by inheriting features from a parent service provider is now described in more detail. As outlined above, in some embodiments, a service provider may include one or more object-oriented classes that may be used to process a particular kind of data object. Each object-oriented class may implement one or more interfaces, and an interface may include various attributes and methods necessary for two different systems or portions of programming code to communicate with each other. To dynamically create a "child" service provider from a parent service provider, the service provider system may inherit various classes in the parent service provider while changing or adding at least one class. For example, to create the child service provider 150 that is shown in FIG. 1A, the service provider system may inherit, or reference, all aspects of the classes 134 and 137 from the parent service provider 131 to create classes 157 and 158, respectively; the service provider system may inherit most aspects of the class 140 but change at least one aspect of the class; and the service provider system may incorporate a completely new class 160 in the child service provider 150 that is not included in the parent service provider 134. In this example, one class 159 is modified in the child service provider 150, and another class 160 is added. However, in some embodiments, the child service provider may differ from the parent service provider in only a single aspect. In some embodiments, the difference between the child and parent service providers may be a single attribute of the class or a single method implemented by an interface in the class. For example, the MRI repository class 159 may differ from the X-Ray repository class in the attribute 147 that is shown in FIG. 1B. The attribute 147 may, for example, specify a particular repository on which the methods of the class 140 operate. The MRI Repository Class may incorporate, by inheritance, the same methods, but those methods may operate on a different repository that is specified by a different attribute (not shown).

Figure 1D:
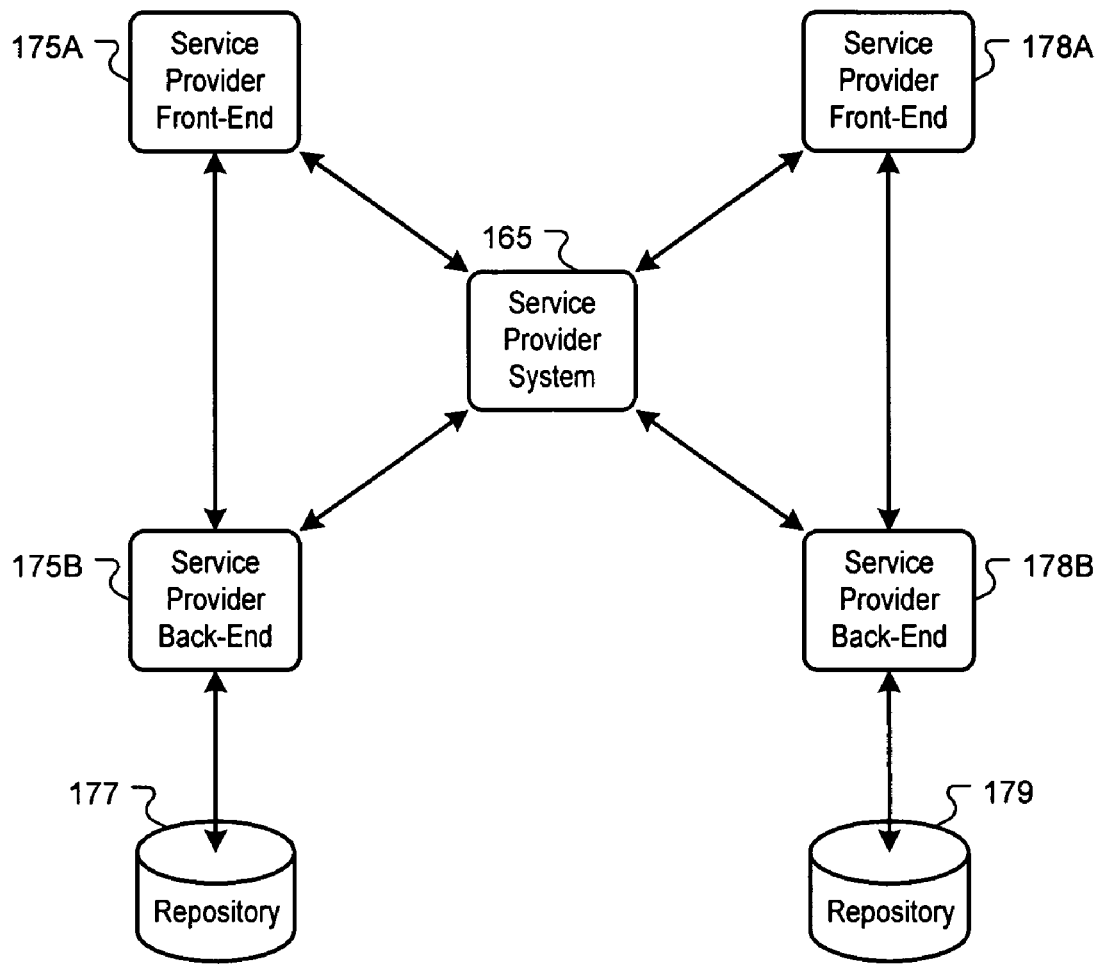
FIG. 1D is a block diagram showing additional aspects of service providers and of a service provider system, according to some embodiments.

FIG. 1D is a block diagram showing additional aspects of service providers and of a service provider system, according to some embodiments. As shown, a service provider 175 may comprise a front-end 175A and a back-end 175B, and the service provider 175 may process data objects that are stored in a particular repository 177. Similarly, another service provider 178 may include a front-end 178A and a back-end 178B, and that service provider 178 may process data objects that are stored in another repository 179. In some embodiments, the front-end 175A may implement user interface functions or application interface functions of the service provider 175. For example, a front-end for the x-ray images service provider 131 may implement methods related to displaying x-ray images in a computer device. In some embodiments, the back-end 175B may implement repository interface functions. For example, a back-end for the x-ray images service provider 131 may implement methods related to authenticating access to an x-ray images repository and subsequently retrieving x-ray images from the repository and transmitting them to the front-end 175A for display. In some embodiments, the front-end 175A and the back-end 175B may communicate directly. Moreover, as will be described in greater detail with reference to FIG. 2, the front-end 175A and the back-end 175B may be physically distributed across multiple pieces of computer hardware, even though logically, the front-end 175A and the back-end 175B may implement a single service provider.

In some embodiments, service providers may interact with each other via the service provider system 165. For example, service providers may pass messages back and forth, or they may call each other's methods to process data objects. More particularly, the front-end 175A may pass a message to the back-end 178B via the service provider system 165. The service provider system 165 may provide a standard interface through which service providers can pass messages or call each other's methods so that individual service providers can be designed and coded independently of the other service providers. Moreover, as described above, the service provider system may provide a standard interface with applications, such as the application 167, so that applications and service providers can be designed and coded independently of each other.

Figure 2:
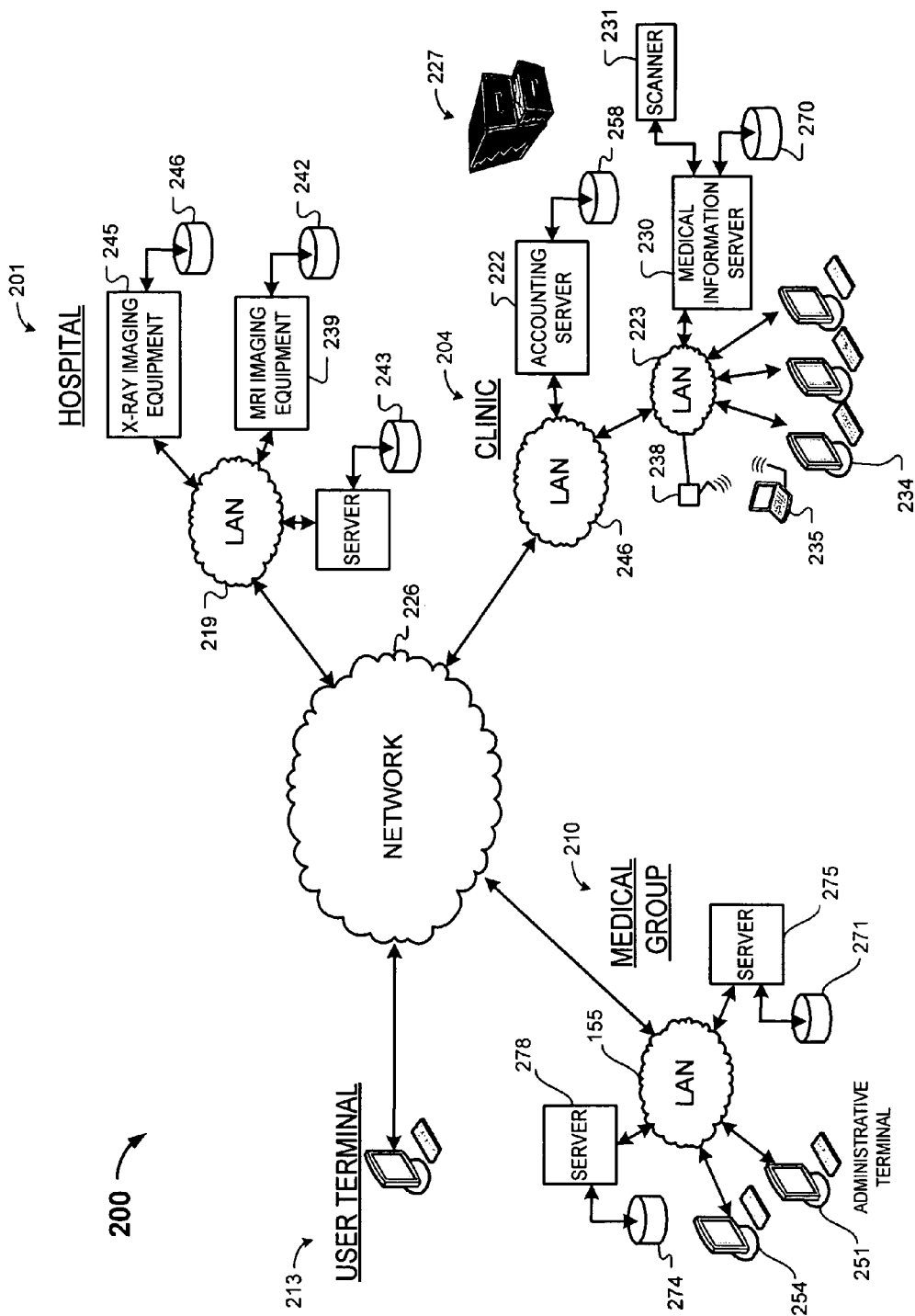
FIG. 2 is a block diagram of a physical system that may implement a digital information system, such as that shown in FIG. 1A, according to some embodiments.

FIG. 2 is a block diagram of an exemplary physical environment 200 in which a digital information system may be implemented, such as the digital information system shown in FIG. 1, according to some embodiments. As shown, the exemplary system 200 is a network of entities that may be associated with the provision of medical services. The exemplary environment 200 includes a hospital 201, a clinic 204, a medical group 210, and a user terminal 213. Various kinds of information may be created and stored in different formats throughout the provision of medical services, and each kind of information may be represented by a data object having a particular data object type. For example, in the exemplary environment 200, a data object may include an MRI image.

Various entities in the system 200 may maintain one or more local area networks (LANs). For example, the hospital may maintain a LAN 219; the clinic 204 may maintain one primary LAN 246 and a sub-network LAN 223; and so on. The LANs of the various entities may connect to a central network 226. The central network 226 may be, for example, a private network, a metropolitan area network (MAN), or the Internet. Regardless of its exact type or topology, the network 226 may permit the various other entities to communicate with each other. Communication may take many forms. For example, the entities may communicate by electronic mail (email), with a file transfer protocol (FTP), or with a virtual private network (VPN). The content of the communication may be in any format, such as text, images, video, etc.

Within the exemplary environment 200, a patient may receive medical services to diagnose and treat a medical problem. For example, a patient may see his or her primary physician at the clinic 204. The primary physician may initially examine the patient in an examining room. The examining room may be equipped with a computer terminal through which the primary physician may access at least some of the patient's medical records for review or to add new medical information. Medical records for the patient may be stored in paper files 227, or in a digital format, such as a scanned image of the paper files 227, on a medical information server 230. In some embodiments, clinic personnel may use a scanner 231 to import paper files 227 into the medical information server 230, such that they are accessible from the computer terminal in the examining room. The computer terminal may be, for example, a hardwired computer terminal 234 that is connected to a network 223. As another example, the computer terminal may be a wireless device 235 that accesses the medical information server 230 through a wireless access point 238 and the network 223. Based on the initial examination, the primary physician may order further testing for the patient. For example, the primary physician may determine that further diagnosis requires various magnetic resonance images (MRIs). These images may be captured at the hospital 201.

At the hospital 201, the patient may have the MRIs taken on MRI imaging equipment 239. The images may be taken and stored in a digital format. They may be stored in a storage device 242 that is connected to or integrated with the imaging equipment 239, or the images may be stored in another storage device, such as networked storage 243 that is accessible through the local network 219. The hospital may also maintain x-ray imaging equipment 245, which may include a coupled x-ray image storage device 246. MRIs may be interpreted at the hospital, for example, by a radiology department. The MRIs may also be provided to the doctor. For example, the MRIs may be electronically transmitted to the medical information server 230 at the clinic, via the hospital's LAN 219, the central network 226, and the clinic's LANs 222 and 223. From the medical information server 230, the doctor may view the MRIs.

In the course of diagnosis and treatment, other physicians may review the patient's medical records. For example, the primary physician may be part of a medical practice group (graphically depicted as the medical group 210). Another physician, such as a reviewing physician in the medical practice group, may review the patient's medical records, for example, from the computer terminal 254. More particularly, the reviewing physician may access the patient's medical records that are stored in the medical information server 230, via the medical group's LAN 255, the central network 226, and the networks 246 and 223 of the clinic.

Each of the medical services provided in the course of diagnosis and treatment may be billed. Various systems may be involved in the billing and payment process. For example, each entity may maintain its own billing system. The billing system of the clinic 204, for example, may include an accounting server 222 and an accounting database 258. Various paper records may also be maintained in paper files 227 for billing purposes.

To manage the myriad of information associated with providing medical services to patients, the medical group 210 may utilize the information system 100 that was conceptually described with reference to the previous figures. An information management system may take many forms. In some embodiments, it may include various modules and components that are installed and executed by different devices in the environment 200. For example, an exemplary information management system may include components in one or more databases, such as the databases 258, 270, 271, and 274; various servers, such as the servers 222, 230, 275, 278; and various display terminals, such as the terminals 234, 235, and 254.

Various components of the information system described with reference to the previous figures may be physically implemented in various physical components shown in FIG. 2. For example, the x-ray repository 122 may be physically implemented in the x-ray storage device 246, the networked storage device 243, the database 270, or in some combination of the three. Similarly, the MRI repository 153 may be implemented in the storage device 242, the storage device 243, the database 230, or in some combination of the three. The demographics repository may be implemented in the database 258. The service providers 125, 128 and 131 may be stored in and executed from various computer devices, such as, for example, the computer devices 230, 251 or 278. More particularly, a front-end for the x-ray images service provider 131 may be implemented on the computer device 254, and a back-end for the x-ray images service provider 131 may be implemented in the x-ray imaging equipment 245.

An information management system may include an administrative terminal 251 through which various components, databases, and information may be integrated, configured and maintained. For example, the service provider system 165 may be implemented in the server 275 and configured from the administrative terminal 251. A configuration user using the administrative terminal 251 may configure the service provider system 165 to dynamically create a service provider 150 from the x-ray images service provider 131 that is distributed across the computer device 254 and the x-ray imaging equipment 254.

An exemplary information management system may include various components that allow it to communicate over various networks, such as the LANs 255, 246 and 223, and over the central network 226. Further, the information management system may include components that enable it to securely connect to, and exchange information with, various other systems, such the systems of the hospital 201, the clinic 204, the medical group 210, and the user terminal 213.

The information management system may be provided by a single software provider, or it may be a complex amalgamation of components from various software providers. Moreover, the information management system may be implemented in various stages. Various exemplary stages of implementing the information management system are now described.

In some embodiments, the first stage of implementation of an information management system may include initial design of the components. That is, the function of the components vis-à-vis other components in an overall operating environment may be defined in a planning or "design stage." In this design stage, the processing steps a component is to perform may be defined, as well as any interfaces the component is to provide, and parameters that the component is to receive as input or provide as output. In some embodiments, this design information may be captured in a design document.

In some embodiments, a second stage of implementation may be a "coding stage," in which individual components may be implemented in actual programming code. At this stage, the programming code may be an intermediate programming code. For example, the programming code may be high-level code like ABAP, C++, or Java that must be compiled or interpreted prior to being able to cause a processor to perform particular tasks, which, together, may implement a function or method.

In some embodiments, a third stage of implementation may be a "configuration stage," in which various components may be configured and integrated to form a specific information management system. For example, a software provider, such as SAP AG, may provide various information management system components that may be used to implement information management systems for any industry, company or organization. In the configuration stage, the various components may be configured and integrated to implement a specific information management system on specific hardware devices. By way of example, various components such as SAP Web Application Server, SAP Enterprise Portal, SAP Master Data Management, SAP Visual Composer and SAP Solution Manager may be integrated and configured to provide an information management system for the exemplary system 100.

In some embodiments, a fourth stage may be "runtime," during which the various configured components cause one or more computer processors to execute instructions that implement various aspects of the information management system. For example, in a runtime stage of the exemplary system 100 described above, a reviewing physician may access a patient's medical records that are stored in various devices throughout a physical network.

Figure 3:
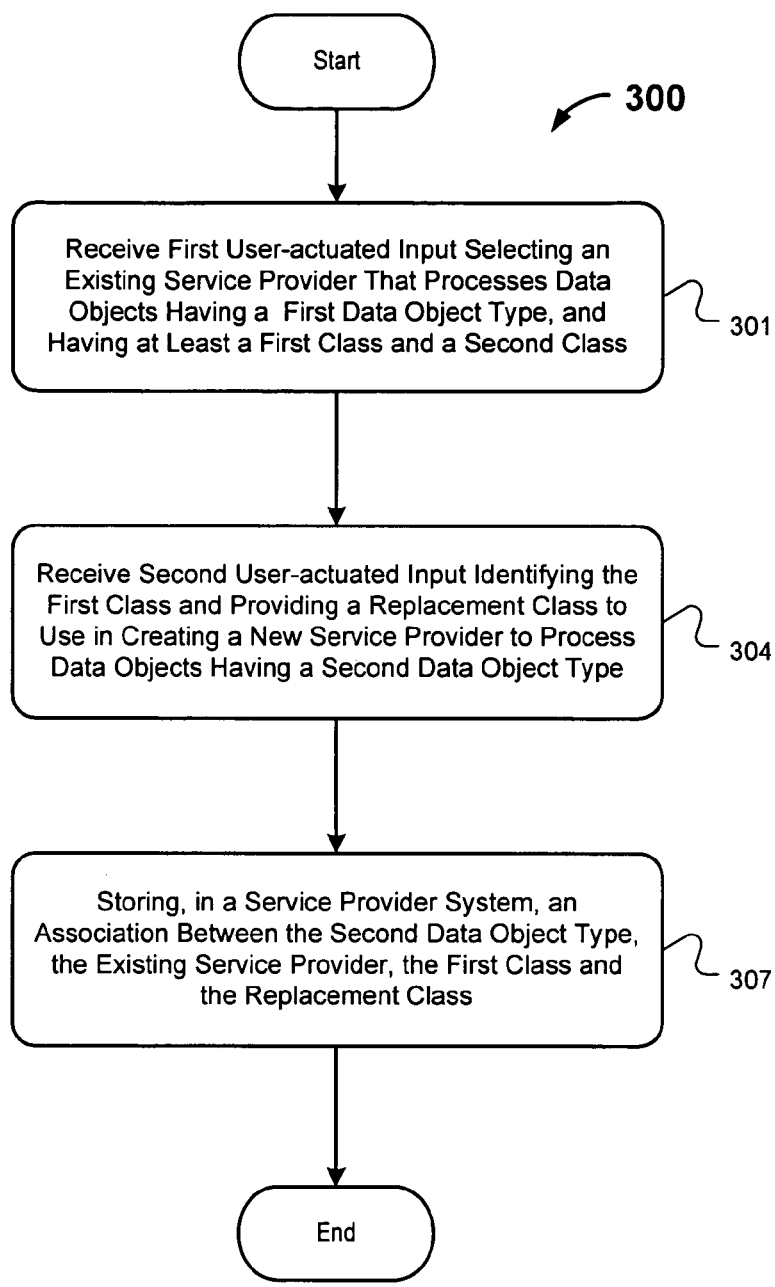
FIG. 3 is a flow diagram illustrating of an exemplary method of configuring a computing device, according to some embodiments.

FIG. 3 is a flow diagram of an exemplary method 300 of configuring a digital information system, according to some embodiments. The actions of the method 300 may be performed by, for example, a computing device in response to input from a configuration programmer to configure a digital information system.

In an action 301, the method 300 receives first user-actuated input selecting an existing service provider that processes data objects having a first data object type. The service provider may have at least a first class and a second class. As an example, the server 275 that is shown in FIG. 2 may receive input from the administrative terminal 251. The input may be user-actuated input entered by a configuration programmer configuring a digital information system that manages, for example, medical information. The input may identify, for example, the service provider 131 that is shown in FIGS. 1A and 1C, and the service provider 131 may process x-ray images 121. The service provider may include a number of classes of programming code, such as, for example, the x-ray repository class 140, the query class 137 and the client class 134.

In an action 304, the method 300 receives second user-actuated input identifying the first class and providing a replacement class to use in creating a new service provider to process data objects having a second data object type. As an example, the server 275 may receive additional input from the administrative terminal 251 in response to a configuration programmer configuring the exemplary medical information system. The additional input may, for example, identify the x-ray repository class 140 and provide the MRI repository class 159 as a replacement class. The MRI repository class 159 may be used to process MRI images 154, in some embodiments, the additional input may also identify a new class, such as, for example, the new class 160.

In an action 307, the method 300 stores, in a service provider system, an association between the second data object type, the existing service provider, the first class and the replacement class. As an example, the server 275 may store in the service provider system 165 an association between MRI images, the x-ray images service provider 131, the x-ray repository class 140 and the MRI repository class 159. More particularly, the server 275 may store, for example, an identifier for the MRI image data object type, an identifier for the x-ray image service provider 131, an identifier for the x-ray repository class 140 and an identifier for the MRI repository class 159, all in a row of a relational database table. The relational database table may, for example, be included in the registry 170 of the service provider 165. As is described in more detail with reference to FIG. 4, the service provider system 165 may use the associations stored in the registry 170 to dynamically create a new service provider, such as the MRI images service provider 150, in order to process MRI images.

Figure 4:
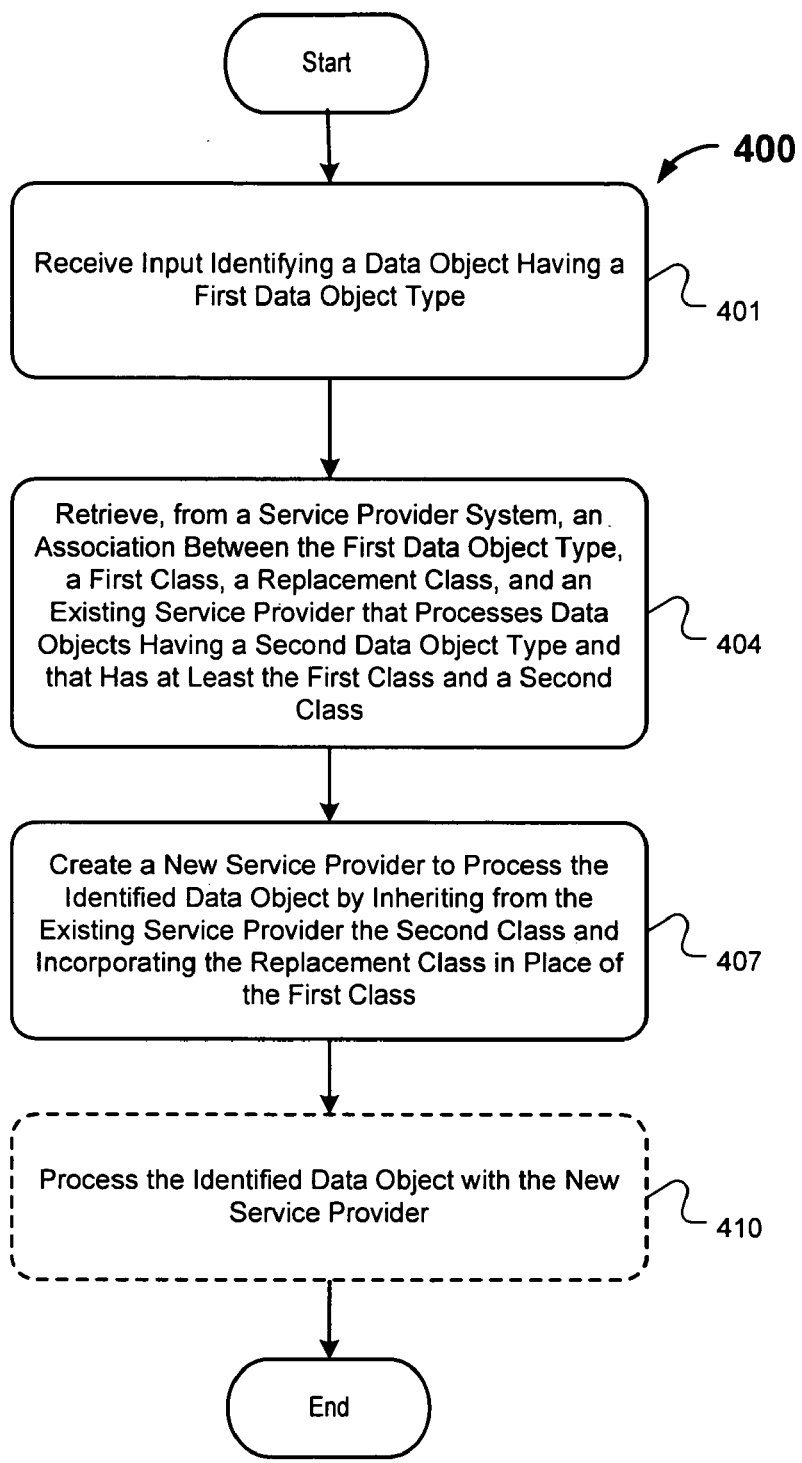
FIG. 4 is a flow diagram of an exemplary method of creating a new service provider, according to some embodiments.

FIG. 4 is a flow diagram of an exemplary method 400 of creating a new service provider, according to some embodiments. The actions of the method 400 may be performed by, for example, a computing device in response to input from a data-object processing application, in order to process a data object.

In a action 401, the method 400 receives input identifying a data object having a first data object type. As an example, the service provider 165 that is shown in FIG. 1C may receive application input from an application, such as the application 167, identifying a data object having an MRI image data object type.

In an action 404, the method 400 retrieves, from a service provider system, an association between the first data object type, a first class, a replacement class and an existing service provider. The existing service provider may process data objects having a second data object type, and the existing service provider may have the first class and a second class. As an example, the method 400 may retrieve from the service provider system 165 the association that was stored in the action 307 described above. In particular, the method 400 may retrieve from the registry 170 an association between the MRI image data object type, the x-ray image service provider 131, the x-ray repository class 140 and the MRI repository class 159. As described above, the x-ray images service provider 131 may include the x-ray repository class 140 and other classes, such as the query class 137 and the client class 134.

In an action 407, the method 400 creates a new service provider to process the identified data object by inheriting from the existing service provider the second class and incorporating the replacement class in place of the first class. As an example, the service provider system 165 may create the MRI images service provider 150 by inheriting the client class 134 to create the inherited class 157, and inheriting the query class 137 to create the inherited class 158. Further, the service provider system 165 may incorporate the MRI repository class 159 into the new MRI images service provider 150 in place of the x-ray repository class 140 that is part of the x-ray images service provider 131. In some embodiments, the service provider system 165 may incorporate additional classes in the new service provider 150, such as, for example, the new class 160.

Subsequently, in an action 410, the method 400 may include processing the identified data object with a new service provider. As an example, the service provider system 165 may cause the new MRI images service provider 150 to process the MRI image that was identified in the action 401. This processing may involve, or be performed on behalf of, the application 167, for example.

Figure 5:
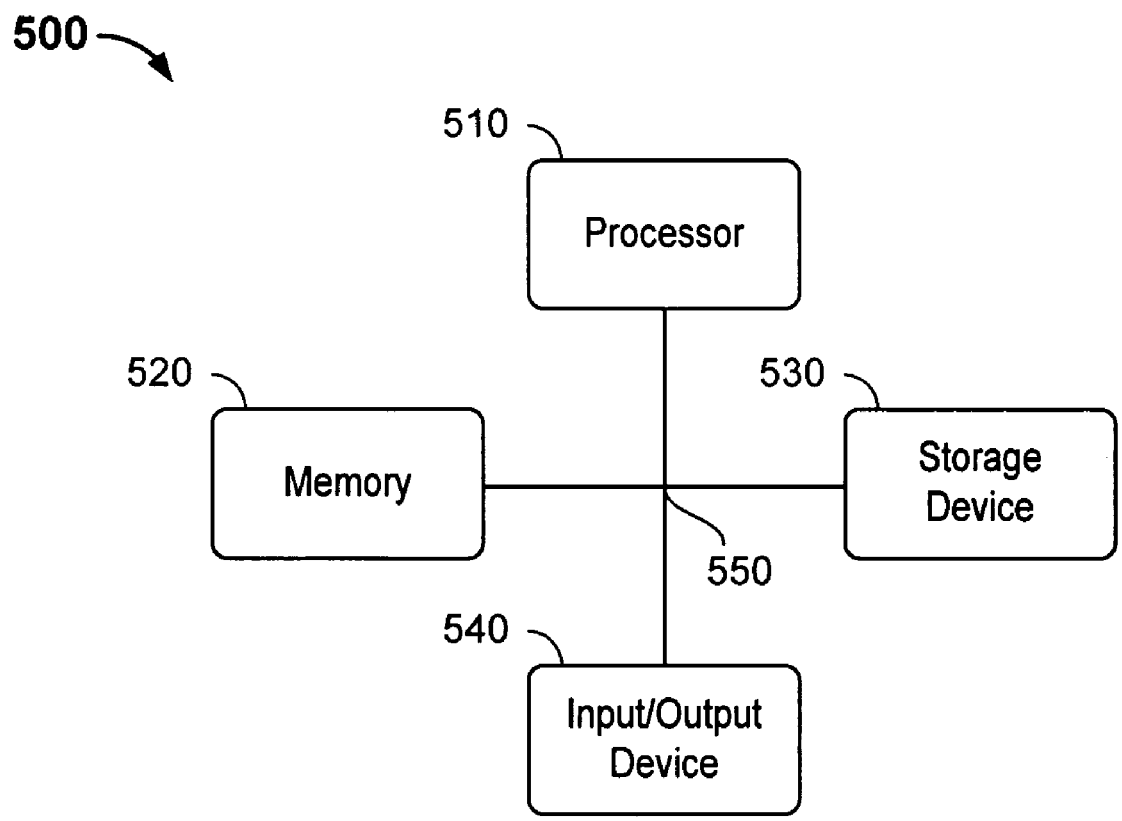
FIG. 5 is a block diagram of an exemplary computer device, according to some embodiments.

FIG. 5 is a block diagram of a computer device 500 that may be used in the operations described above, according to some embodiments. The computer device 500 includes a processor 510, a memory 520, a storage device 530 and an input/output device 540. Each of the components 510, 520, 530 and 540 are interconnected using a system bus 550.

The processor 510 is capable of processing instructions for execution within the computer device 500. In some embodiments, the processor 510 is a single-threaded processor. In other embodiments, the processor 510 is a multi-threaded processor. The processor 510 is capable of processing instructions stored in the memory 520 or on the storage device 530 to display graphical information for a user interface on the input/output device 540.

The memory 520 stores information within the computer device 500. In some embodiments, the memory 520 is a computer-readable medium. In some embodiments, the memory 520 is a volatile memory unit. In some embodiments, the memory 520 is a non-volatile memory unit.

The storage device 530 is capable of providing mass storage for the computer device 500. In some embodiments, the storage device 530 is a computer-readable medium. In various other embodiments, the storage device 530 may be a floppy disk device, a hard disk device, an optical disk device, or a tape device.

The input/output device 540 provides input/output operations for the computer device 500. In some embodiments, the input/output device 540 includes a keyboard and/or pointing device. In some embodiments, the input/output device 540 includes a display unit for displaying graphical user interfaces.

The method may be implemented in digital electronic circuitry, or in computer hardware, firmware, software, or in combinations of them. Apparatus may be implemented in a computer program product tangibly embodied in an information carrier, e.g., in a machine-readable storage device or in a propagated signal, for execution by a programmable processor; and actions of the method may be performed by a programmable processor executing a program of instructions to perform functions of the invention by operating on input data and generating output. Embodiments may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, a computer device may include a display device such as a CRT (cathode ray tube) or LCD (liquid crystal display) monitor for displaying information to the user and a keyboard and a pointing device such as a mouse or a trackball by which the user may provide input to the computer.

Apparatus and methods disclosed herein may be implemented in a computer system that includes a back-end component, such as a data server; or that includes a middleware component, such as an application server or an Internet server; or that includes a front-end component, such as a client computer having a graphical user interface or an Internet browser, or any combination of them. The components of the system may be connected by any form or medium of digital data communication such as a communication network. Examples of communication networks include, e.g., a LAN, a WAN, and the computers and networks forming the Internet.

The computer system may include clients and servers. A client and server are generally remote from each other and typically interact through a network, such as the described one. The relationship of client and server may arise by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A computer-implemented method of configuring a computing system, the method comprising:
    receiving first user-actuated input selecting an existing service provider that processes data objects having a first data object type, the existing service provider comprising at least a first class and a second class;
    receiving second user-actuated input identifying the first class and providing a replacement class to use in creating a new service provider to process data objects having a second data object type; and
    storing, in a service provider system, an association between the second data object type, the existing service provider, the first class and the replacement class, so that during runtime, the service provider system creates the new service provider to process data objects having the second data object type by inheriting the second class from the existing service provider and incorporating the replacement class in place of the first class.

2. The computer-implemented method of claim 1, further comprising registering the existing service provider in the service provider system.

3. The computer-implemented method of claim 2, wherein registering the existing service provider comprises storing in the service provider system a description of the first class and a description of the second class.

4. The computer-implemented method of claim 2, further comprising displaying a list in a graphical user interface, the list comprising the existing registered service provider and other registered service providers in the service provider system.

5. The computer-implemented method of claim 4, wherein the first user-actuated input is received in response to displaying the list.

6. The computer-implemented method of claim 1, wherein the first user-actuated input is received during a configuration time that precedes runtime.

7. The computer-implemented method of claim 1, wherein the first class comprises class programming code that, when executed, performs a first processing operation on data objects having the first data object type, and the second class comprises additional class programming code that, when executed, performs a second processing operation on data objects having the first data object type.

8. The computer-implemented method of claim 7, wherein the first class further comprises a class attribute that controls a first aspect of the first processing operation.

9. The computer-implemented method of claim 8, wherein the replacement class comprises the class programming code and a replacement class attribute that controls the first aspect or another aspect of the first processing operation, the replacement class attribute being different than the class attribute.

10. The computer-implemented method of claim 8, wherein the replacement class comprises replacement programming code that, when executed, performs an additional processing operation on data objects having the second data object type, the replacement programming code being different than the class programming code.

11. The computer-implemented method of claim 8, wherein inheriting the second class comprises incorporating the second class in the new service provider without changing the additional class programming code.

12. The computer-implemented method of claim 1, wherein storing the association comprises storing an identifier for the second data object type, an identifier for the existing service provider, an identifier for the first class and an identifier for the replacement class in a row of a relational database table.

13. A computer-implemented method of creating a new service provider, the method comprising:
    receiving, during runtime of a computing system, input identifying a data object having a first data object type;
    retrieving, from a service provider system, an association between the first data object type, a first class, a replacement class, and an existing service provider that processes data objects having a second data object type, the existing service provider comprising at least the first class and a second class; and
    creating a new service provider to process the identified data object by inheriting from the existing service provider the second class and incorporating the replacement class in place of the first class.

14. The computer-implemented method of claim 13, wherein the first class comprises class programming code that, when executed, performs a first processing operation on data objects having the second data object type, and the second class comprises additional class programming code that, when executed, performs a second processing operation on data objects having the second data object type.

15. The computer-implemented method of claim 14, wherein the first class further comprises a class attribute that controls a first aspect of the first processing operation.

16. The computer-implemented method of claim 15, wherein the replacement class comprises the class programming code and a replacement class attribute that controls the first aspect or another aspect of the first processing operation, the replacement class attribute being different than the class attribute.

17. The computer-implemented method of claim 14, wherein inheriting the second class comprises incorporating the second class in the new service provider without changing the additional class programming code.

18. The computer-implemented method of claim 14, wherein the input is received from one of multiple applications in the computing system, each of the multiple applications processing data objects by employing service providers.

19. The computer-implemented method of claim 14, further comprising processing the identified data object with the new service provider.

20. A computer program product tangibly embodied in a storage device, the computer program product comprising instructions that, when executed, cause a processor to perform operations comprising:
    receiving first user-actuated input selecting an existing service provider that processes data objects having a first data object type, the existing service provider comprising at least a first class and a second class;

receiving second user-actuated input identifying the first class and providing a replacement class to use in creating a new service provider to process data objects having a second data object type; and storing, in a service provider system, an association between the second data object type, the existing service provider, the first class and the replacement class, so that during runtime, the service provider system creates the new service provider to process data objects having the second data object type by inheriting the second class from the existing service provider and incorporating the replacement class in place of the first class.

21. The computer-implemented method of claim 1, wherein storing an association between the second data object type, the existing service provider, the first class and the replacement class comprises storing the association in a registry.

22. The computer-implemented method of claim 13, wherein the retrieving is performed after the receiving input identifying a data object having a first data object type.

23. The computer-implemented method of claim 13, wherein the retrieving is performed in response to the receiving input identifying a data object having a first data object type.

24. Apparatus comprising:

a processor configured to:

receive first user-actuated input selecting an existing service provider that processes data objects having a first data object type, the existing service provider comprising at least a first class and a second class;

receive second user-actuated input identifying the first class and providing a replacement class to use in creating a new service provider to process data objects having a second data object type; and store, in a service provider system, an association between the second data object type, the existing service provider, the first class and the replacement class, so that during runtime, the service provider system creates the new service provider to process data objects having the second data object type by inheriting the second class from the existing service provider and incorporating the replacement class in place of the first class.

25. Apparatus comprising:

a processor configured to:

receive, during runtime of a computing system, input identifying a data object having a first data object type;

retrieve, from a service provider system, an association between the first data object type, a first class, a replacement class, and an existing service provider that processes data objects having a second data object type, the existing service provider comprising at least the first class and a second class; and create a new service provider to process the identified data object by inheriting from the existing service provider the second class and incorporating the replacement class in place of the first class.

* * * * *